(12) United States Patent
Vetter

(10) Patent No.: US 6,242,150 B1
(45) Date of Patent: Jun. 5, 2001

(54) PANORAMIC 70MM FILM SYSTEM

(75) Inventor: Richard H. Vetter, Carlsbad, CA (US)

(73) Assignee: Clearvision 2000, Inc., Carlsbad, CA (US)

( * ) Notice: Subject to any disclaimer, the term of this patent is extended or adjusted under 35 U.S.C. 154(b) by 0 days.

(21) Appl. No.: 09/518,534

(22) Filed: Mar. 4, 2000

(51) Int. Cl.[7] .................................................. G03C 5/14
(52) U.S. Cl. .......................... 430/140; 430/496; 430/934; 430/434; 352/38; 352/40; 352/44; 352/241
(58) Field of Search .................................. 430/496, 934, 430/140, 434; 352/38, 40, 44, 241

(56) References Cited

U.S. PATENT DOCUMENTS

| | | |
|---|---|---|
| 2,077,702 | 4/1937 | Lane . |
| 3,396,021 | 8/1968 | Monteleoni et al. . |
| 3,865,738 | 2/1975 | Lente . |
| 5,386,255 | 1/1995 | Beard et al. . |
| 5,534,954 * | 7/1996 | Vetter ...................................... 352/79 |
| 5,579,064 * | 11/1996 | Vetter ...................................... 352/38 |
| 5,619,255 * | 4/1997 | Booth ..................................... 348/36 |
| 5,627,614 * | 5/1997 | Weisgerber ............................ 352/46 |
| 5,739,894 * | 4/1998 | Weisgerber ............................ 352/46 |
| 5,745,213 * | 4/1998 | Goodhill et al. ....................... 352/27 |
| 5,751,398 | 5/1998 | Beard . |
| 6,011,610 * | 1/2000 | Allen ....................................... 352/5 |

* cited by examiner

Primary Examiner—Hoa Van Le
Assistant Examiner—Amanda C. Walke
(74) Attorney, Agent, or Firm—Leon D. Rosen

(57) ABSTRACT

A 70 mm motion picture film (80 in FIG. 3) is provided which can be projected by a standard 70 mm motion picture projector onto widely available theater projection screens, where the film results in a projected image (90) having a width-to-height (E/F) aspect ratio of 2.4 to 1, instead of the previous 2.2 to 1 aspect ratio, with the projected image having the same height as previously. The new 70 mm film has film frames (82) that each occupies over 95% of the horizontal distance (M) between the two rows of perforations (60, 62), and preferably 99% of the distance between the rows of perforations. Sound is produced by a disk controlled by a timing track (96) that lies between one row of perforations (60) and an edge (106) of the film strip.

3 Claims, 3 Drawing Sheets

PANORAMIC 70MM FILM SYSTEM

BACKGROUND OF THE INVENTION

Until the 1950's, 35 mm film was commonly used in commercial motion picture theaters, with film frames spaced along the film strip by four perforations. This resulted in a width-to-height aspect ratio of about 1.33 to 1. In the early 1950's, a new format called CinemaScope was introduced wherein each film frame still had a height of nearly four perforations, but had been horizontally compressed. An anamorphic projection lens was substituted for the previous nonanamorphic (nondistorting) lens, to horizontally expand the image by about two times, to project an image having a width-to-height aspect ratio of 2.4 to 1. Substantially all first run motion picture theaters, and most second run theaters installed new projection screens having an aspect ratio of 2.4 to 1 to show CinemaScope. In the 1950's, "ordinary" or non-CinemaScope films continued to use 35 mm film frames spaced by four perforations. However, only a portion of each film frame, occupying a height of about 2.5 perforations, was projected onto the screen. This resulted in the projected image having an aspect ratio of 1.85 to 1. When "ordinary" 35 mm film was shown, masks were installed at opposite sides of the screen to produce a screen aspect ratio of 1.85 to 1.

Over the past four decades, most theaters in large markets (which generate most of the revenue) have installed projectors that project 70 mm film, using a nonanamorphic lens. The 70 mm film has six sound tracks, with four of the tracks lying outside the rows of perforations and two other tracks each lying between a row of perforations and the film frame. Each film frame has a height of about five perforations, resulting in a film frame having an aspect ratio of 2.2 to 1. The projected image has the same aspect ratio. The projected image occupies most of the width of the screen that was initially designed to show CinemaScope, but with masks at opposite sides of the screen to reduce the aspect ratio to 2.2 to 1. If the CinemaScope image and 70 mm image are compared, it would be noticed that the CinemaScope image is wider because it occupies substantially the entire width of the projection screen, but the present 70 mm image is superior. The 70 mm projected image is superior because it has greater definition due to the larger film frame on the film strip, and to the fact that a nonanamorphic lens can be used. Anamorphic projection lenses of all but the highest quality and highest cost produce noticeable distortion of the film frame (linear distortion and especially astigmatism) when projecting it. Up until now, 70 mm film, which produces a bright and clear projected image of a 2.2 to 1 aspect ratio, has been the best image available in commercial motion picture theaters. If an even better projected image could be obtained at low additional expense, this would be of value for the motion picture industry.

SUMMARY OF THE INVENTION

In accordance with one embodiment of the present invention, a new 70 mm film is provided, which can be projected by existing 70 mm theater projectors with minimum modification, and which can produce larger images on the most common projection screens already in use in theaters. The new 70 mm film has film frames of a width that occupies almost the entire distance between the two rows of perforations of the standard 70 mm film, to create film frames of greater width than that of prior art 70 mm film. The new images can be projected by the use of existing nonanamorphic 70 mm projection lenses. Instead of using sound tracks between the two rows of perforations of the film, applicant uses nearly the entire width between perforation rows, and provides a timing track that lies between a row of perforations and an adjacent edge of the film. The timing track controls a multi-track sound playback apparatus such as a CD player. The existing screen is used, but is modified by the owner who removes the side masks that previously reduced the original aspect ratio of 2.4 to 1 to an aspect ratio of 2.2 to 1 for the prior 70 mm film.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
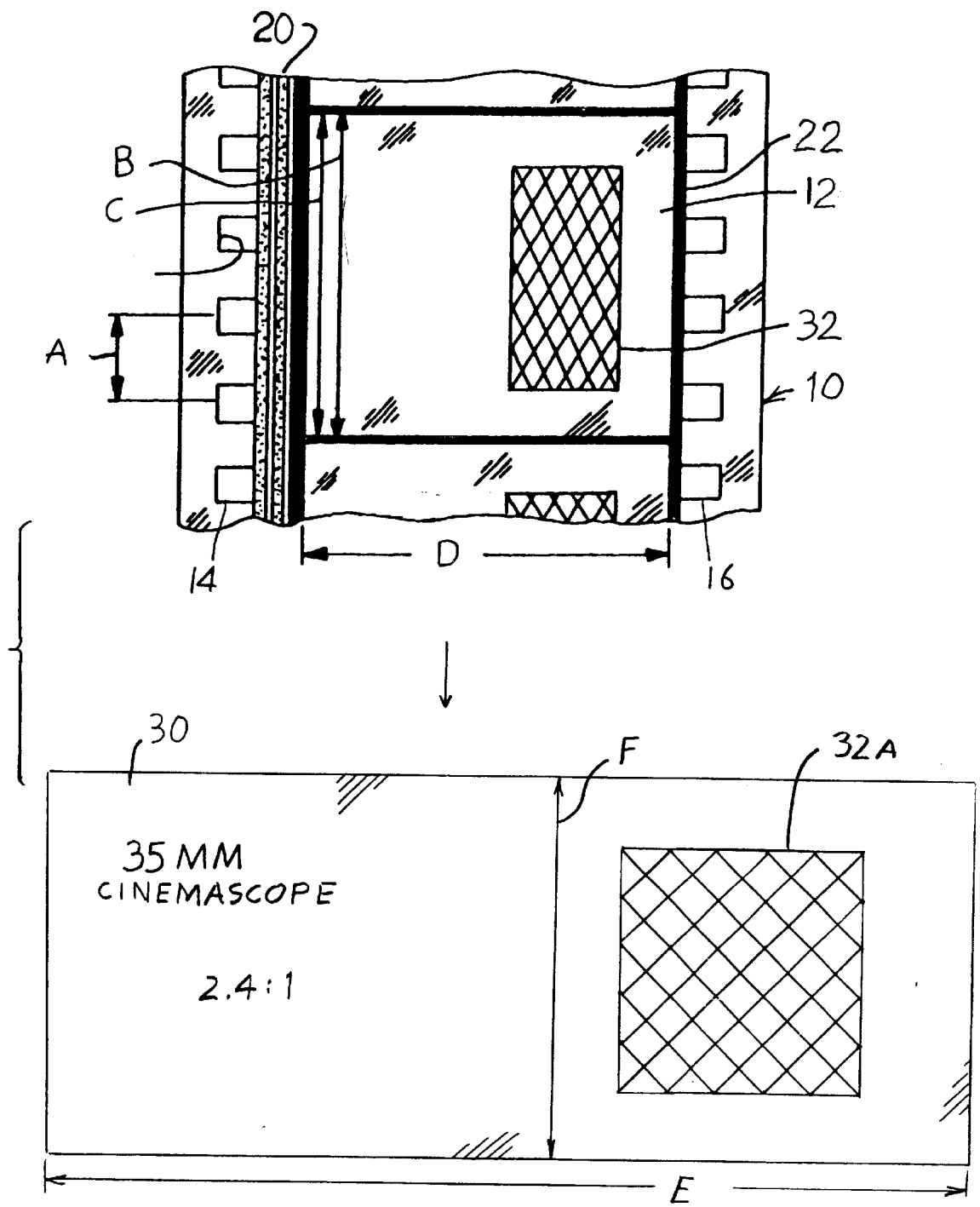
FIG. 1 is a view of a portion of a prior art CinemaScope film on 35 mm film stock, and a view of the image projected from the film onto a projection screen.

FIG. 1 illustrates a strip 10 of CinemaScope film that was introduced in the 1950's. The strip is formed from standard 35 mm film stock that has two rows of perforations 14, 16, with the perforations spaced at a pitch A of 0.187 inch. The film frames 12 are spaced apart by a distance B of 4 perforations or 0.74 inch, with each film frame having a height C of about 0.735 inch. Each film frame has a width D of 0.868 inch, which occupies about 90% of the distance between the two rows of perforations 14, 16. Sound tracks 20 occupy a space between one side of the film frames and one row 14 of perforations. An opaque area 22 surrounds each frame. The aspect ratio, which is the width D divided by the height C was about 1.2 to 1 (depending upon the exact height C of the film frame). An anamorphic projection lens was used to project the film frame onto a screen. The anamorphic lens horizontally expanded the image by a factor of 2 to 1. The projected image 30 had a width E that was 2.4 times as great as its height F (or 2.35 times as much in some cases). Thus, a virtual object 32 on the film frame which was a rectangle having a width half that of its height, resulted in a virtual object 32A on the projected image, which was a square having the same width as its height. Of course, the projected image has an area many times greater than that of the film frame, depending upon the size of screen to be filled by the image.

The CinemaScope format of the filmstrip 10 of FIG. 1 became popular. Almost all first-run theaters installed a screen having a width-to-height aspect ratio of about 2.4 to 1 so the screen was substantially completely filled by the CinemaScope image 30. One problem with the image 30 was that the edges tended to be distorted because moderately priced anamorphic lenses create such distortion.

Figure 2:
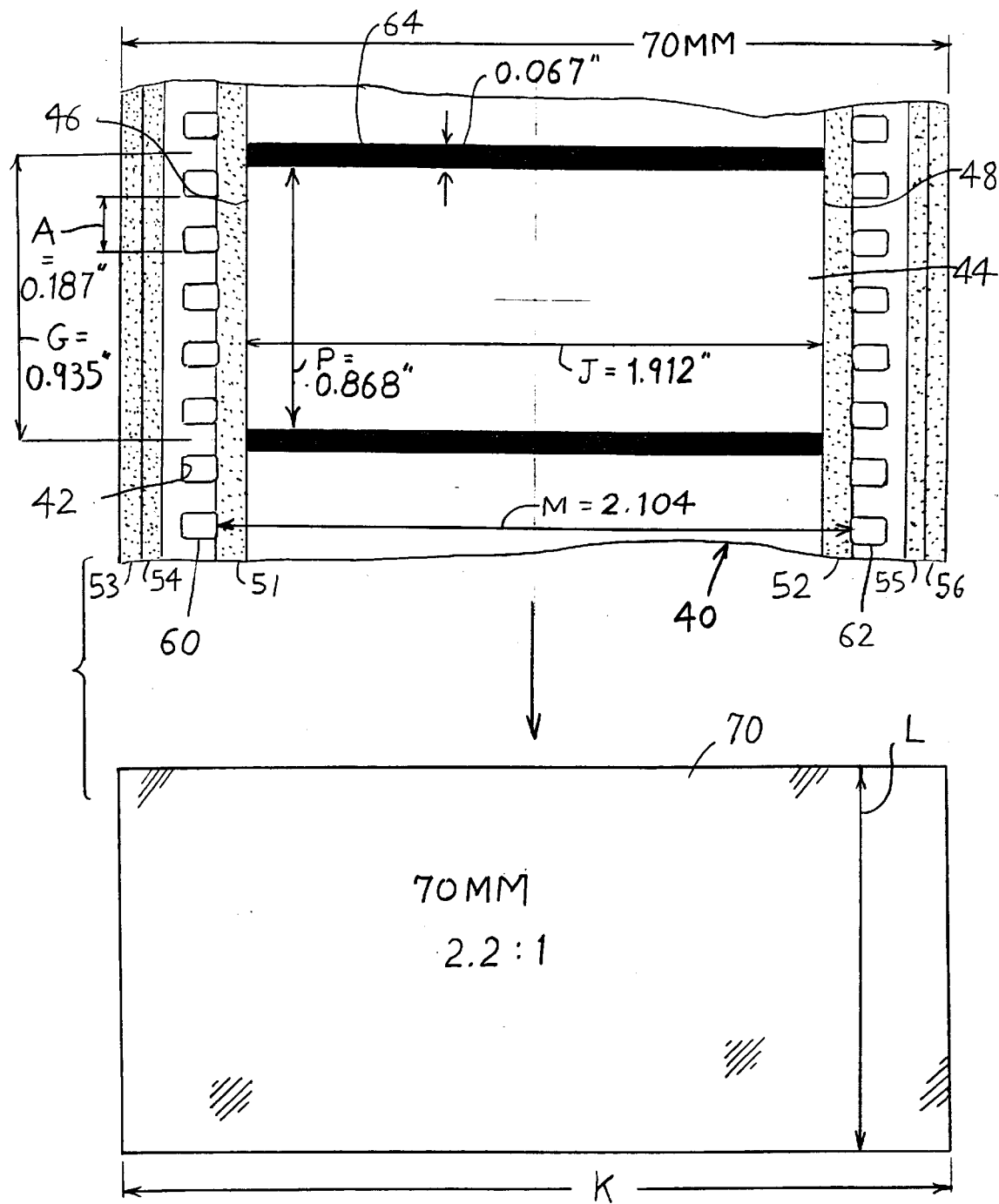
FIG. 2 is a partial front elevation view of a prior art 70 mm film strip, and a front elevation view of the image projected on a projection screen by a standard 70 mm nonanamorphic lens.

FIG. 2 shows a prior art 70 mm filmstrip 40 that is in use in many first-run theaters at the present time. The strip has perforations 42 of the same size and spacing along the length of the strip, as on standard 35 mm film, so the perforation pitch A is 0.187 inch. The strip has film frames 44 that are spaced apart by a distance G equal to the spacing G of 5 perforations, or 0.935 inch. The 70 mm film strip has six magnetic sound tracks 51–56 with two of them lying between an edge 46, 48 of a film frame 44 and a row 60 or 62 of perforations, and with a pair of sound tracks lying between each row of perforations and an adjacent edge of the film strip. A separation line 64 lies between adjacent film frames, and has a height of 0.067 inch. The resulting film frame 44 has a height P of 0.868 inch and a width J of 1.912 inch. This results in a width-to-height aspect ratio of 2.2 to 1. The width of the film frame is substantially 91% of the distance M between the two rows of perforations of the film.

The film frame 44 is projected onto a projection screen by a nonanamorphic (spherical) lens, which produces a projected image 70 having an aspect ratio of 2.2. That is, the width K of the projected image is 2.2 times the height L of the projected image. Theater owners easily accommodate this image, which fills the entire height of the projection screen, by placing light-absorbing masks at opposite sides of the screen to leave a screen area having an aspect ratio of 2.2 to 1. The 70 mm film frame area is 2.92 times greater than the 35 mm film frame area, leading to less magnification and therefore a sharper and less distorted image. Also, a moderate cost nonanamorphic projection lens produces a sharper projected image over the entire projected image. As a result, the 70 mm film strip 40 of FIG. 2 has been widely accepted. That is, many first run theaters (other than specialty theaters such as IMAX) project 70 mm film.

Figure 3:
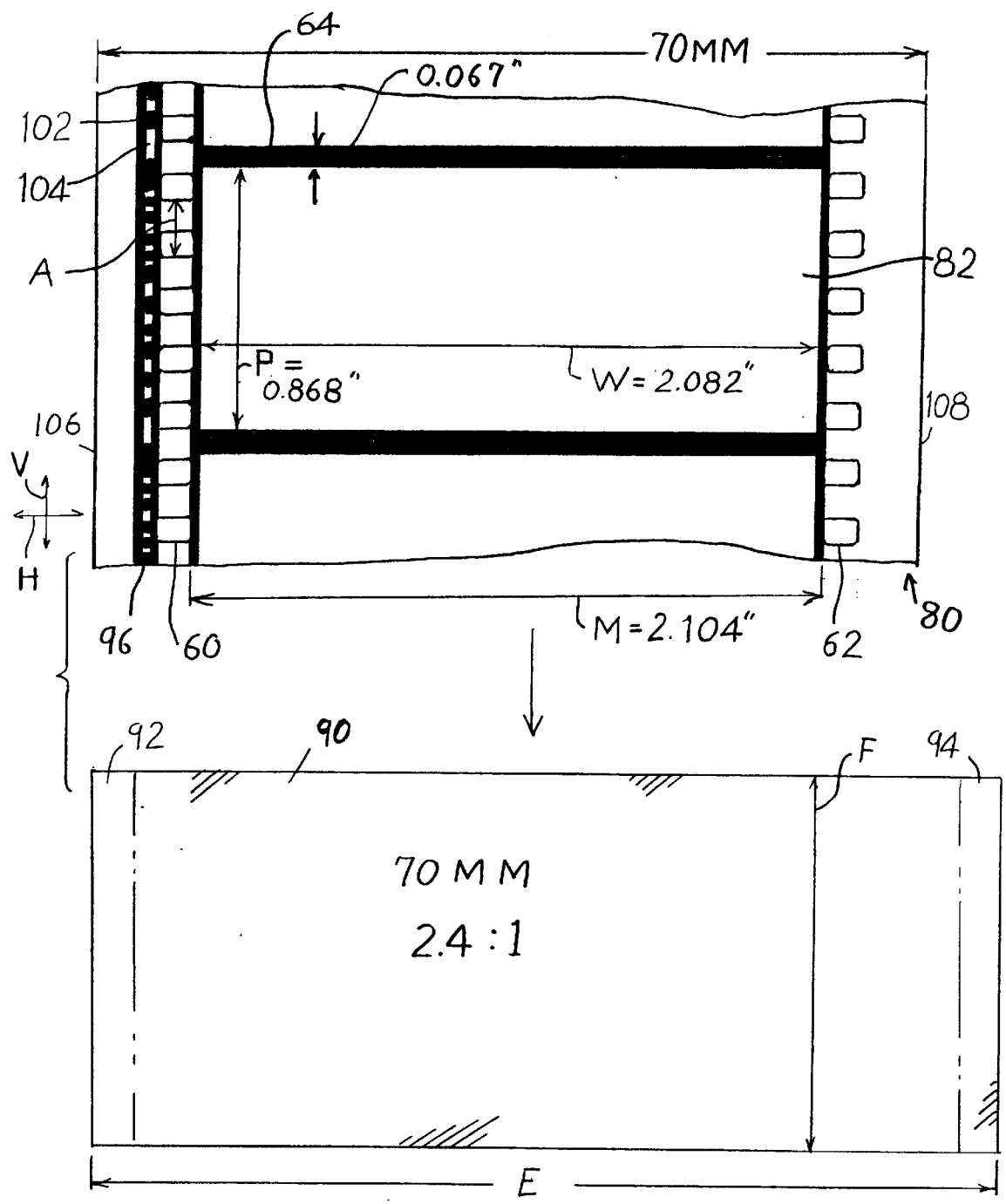
FIG. 3 is a partial front elevation view of a new 70 mm film strip of the present invention and a front elevation view of a projected image that is projected onto the screen using the same 70 mm nonanamorphic lens used in FIG. 2.

FIG. 3 illustrates a new 70 mm motion picture filmstrip 80 of the present invention, which uses standard 70 mm film stock having two rows of perforations 60, 62. The perforations along each row are spaced by the distance A of 0.187 inch, and the distance between adjacent edges of the two rows is a distance M of 2.104 inches. The details can be better explained by describing the rows 60, 62 as extending in a vertical direction V and the two rows being spaced in a horizontal direction H. Applicant forms film frames 82 that each has a vertical height P of 0.868 inch, with a horizontal separation line 64 between adjacent film frames having a thickness of 0.067 inch, which are all the same as in the prior art 70 mm film frame of FIG. 2. However, applicant forms each film frame to have a horizontal width W of 2.082 inches. The width W is 2.4 times the height P of the film frame. As a result, when the film frame 82 is projected onto a screen using the nonanamorphic (spherical) 70 mm lens on a common 70 mm projector, the projected image 90 has a width E that is 2.4 times the height F of the projected image, for an aspect ratio of 2.4 to 1.

As a result of the projected image 90 having an aspect ratio of 2.4 to 1, a theater owner can use the entire width of the projection screen. The owner only has to move the masks at opposite sides of the screen. The projected image 90 of FIG. 3 has the same clarity as the prior art 70 mm projected 70 of FIG. 2, in that the additional areas 92, 94 at opposite sides of the projected image result from additional area on the film frame 82. Projection lenses for 70 mm film can readily project both of the images 44 of FIG. 2 and 82 of FIG. 3. As a result of applicant using the new 70 mm film strip 80, an image is projected onto the screen using the same 70 mm projector with the same 70 mm projection lens, and using the same projection screen in a theater (but with the side masks moved outboard), and yet an image of 10% greater width is projected onto the theater projection screen. The 10% addition to the width of the image is significant in enhancing the panoramic quality of the image.

Instead of providing the six sound tracks 51, 54 of FIG. 2, applicant does not have a conventional optical sound track on the film, but instead provides a timing track 96. Such timing tracks, which are known in the prior art, have alternate opaque and transparent areas 102, 104 spaced along the length of the film strip, to time playing of a CD or other sound recording in synchronation with movement of the filmstrip through the projector. The timing track 96 is positioned between one row 60 of perforations and an adjacent one of the edges 106, 108 of the filmstrip. A magnetic track sensor on the existing projector is replaced by an optical sensor which detects the opaque and transparent areas of the timing track.

Although applicant prefers to use a film frame width W of 2.082 inch, which is substantially 99% (actually 0.9895%) of the distance M between the two rows of perforations, any significant increase in frame width is desirable. An increase in the frame width W to at least 95% of the spacing M between perforation rows, results in an aspect ratio of 2.30 to 1, which is a significant increase over the prior 2.2 to 1 ratio. The frame width W is preferably at least 97% of the distance M to provide an aspect ratio of at least 2.35 to 1. Although the aspect ratio can be increased by increasing the thickness of the separation line 64, this would result in less area for the film frame and a consequent degradation in image sharpness.

Thus, the invention makes use of the fact that most theater projection screens are capable of displaying an image having an aspect ratio of 2.4 to 1 (2.35 to 1 in some cases), and that many theaters in major film markets use high quality 70 mm projectors with 70 mm nonanamorphic (spherical) projection lenses. Applicant uses these facts in order to produce a projected image of the same sharpness as is presently produced, but with an increased projected aspect ratio and width and with the same sharpness as is currently produced. Applicant does this by using a greater portion of the width of the film that lies between the two rows of perforations, with applicant preferring to use over 95% of the width and preferably substantially 99% (98.5% to 100%) of the available width. Sound reproduction is achieved by a timing track lying between a row of perforations and an extreme edge of the film.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A new 70 mm film, comprising:

a new strip of 70 mm film which has opposite vertically-extending parallel edges and which has two vertically extending standard rows of perforations, said rows of perforations being separated by a horizontal distance W of 2.104 inches with the perforations of each row being vertically spaced at a pitch of 0.187 inch, with said strip having frames that are vertically spaced apart by 5 perforations, with each frame having a vertical height of 0.868 inch and a horizontal width that is substantially 99% of the distance W;

said new strip having a vertically-extending timing track that has alternating opaque and transparent areas and that lies between one of said rows of perforations and an adjacent one of said edges.

2. A method for using a standard 70 mm theater projector that has a nonanamorphic lens, and 70 mm film, to project an image on a theater screen where the projected image has a width-to-height aspect ratio of at least 2.35 to 1, comprising:

exposing and developing a strip of standard 70 mm film stock which has two parallel rows of perforations and which has opposite side edges, to produce film frames spaced apart by 5 perforations along the length of the strip, and with each film frame having a width that is at least 95% of the distance between the two rows of film perforations;

said step of exposing and developing including creating a timing track which includes alternate opaque and transparent areas along a narrow strip that lies between one of said rows of perforations and a corresponding one of said side edges of said strip;

removing any side masks on a projection screen that has a width-to-height ratio of at least 2.35 to 1, to leave substantially the entire projection screen exposed, and projecting said film frames onto said projection screen to substantially completely fill said projection screen with the projected image of the film frames.

3. A 70 mm film for use at a commercial motion picture theater that has a projection screen that was designed to display a projected image where the projection screen has a width-to-height aspect ratio of substantially 2.4 to 1, where the theater has a film projector with a film drive which is designed to move standard 70 mm film that has two rows of perforations and film frames spaced apart by 5 perforations, where the projector has a nonanamorphic 70 mm projection lens that is designed to project standard 70 mm images that lie on the standard 70 mm film onto the projection screen, where each of the standard 70 mm images has a width of 91% of the distance between the two rows of perforations and has an aspect ratio of 2.2 to 1 to leave room for sound tracks between each side of the standard 70 mm image and a row of perforations, comprising:

a strip of standard 70 mm film stock that has two rows of perforations and that has film frames spaced apart by 5 perforations, where the film frames each occupy over 95% of the distance between the two rows of perforations so each film frame can have an aspect ratio of at least 2.3 to 1;

said strip of standard 70 mm film stock has a pair of edges extending along a length direction of said strip, and said strip of standard 70 mm film stock forms an elongated timing track which extends parallel to said edges and that has alternating opaque areas and transparent areas spaced along the length of said timing track, with said timing track lying between of one of said rows of perforations and an adjacent one of said edges.

* * * * *